United States Patent
Belliveau (10) Patent No.: US 7,048,383 B2
(45) Date of Patent: *May 23, 2006

(54) THEATRICAL FOG PARTICLE PROTECTION SYSTEM FOR IMAGE PROJECTION LIGHTING DEVICES

(76) Inventor: Richard S. Belliveau, 10643 Floral Park, Austin, TX (US) 78759

( * ) Notice: Subject to any disclaimer, the term of this patent is extended or adjusted under 35 U.S.C. 154(b) by 0 days.

This patent is subject to a terminal disclaimer.

(21) Appl. No.: 11/238,239

(22) Filed: Sep. 29, 2005

(65) Prior Publication Data

US 2006/0023168 A1  Feb. 2, 2006

Related U.S. Application Data

(63) Continuation of application No. 10/657,630, filed on Sep. 8, 2003, now Pat. No. 6,988,807, which is a continuation-in-part of application No. 10/360,185, filed on Feb. 7, 2003, now Pat. No. 6,969,960.

(51) Int. Cl.
G09G 3/36 (2006.01)

(52) U.S. Cl. .......................... 353/57; 353/55; 345/101
(58) Field of Classification Search ...................... None
See application file for complete search history.

(56) References Cited

U.S. PATENT DOCUMENTS

| | | | |
|---|---|---|---|
| 4,171,211 A * | 10/1979 | Carter | 55/493 |
| 4,323,374 A * | 4/1982 | Shinagawa et al. | 96/58 |
| 4,701,833 A | 10/1987 | Bornhorst | 362/294 |
| 5,828,485 A | 10/1998 | Hewlett | 359/291 |
| 5,829,868 A | 11/1998 | Hutton | 362/276 |
| 5,988,817 A | 11/1999 | Mizushima et al. | 353/94 |
| 6,057,958 A | 5/2000 | Hunt | 359/291 |
| 6,156,089 A * | 12/2000 | Stemmer et al. | 55/467 |
| 6,188,933 B1 | 2/2001 | Hewlett et al. | 700/19 |
| 6,208,087 B1 | 3/2001 | Hughes et al. | 315/291 |
| 6,219,093 B1 | 4/2001 | Perry | 348/135 |
| 6,710,762 B1 * | 3/2004 | Hasegawa | 345/101 |

OTHER PUBLICATIONS

Catalyst System Brochure.
High End System Product Line 1997.
Catalyst Media in Motion, © 2002 High End Systems, Inc.

* cited by examiner

Primary Examiner—David Vu
(74) Attorney, Agent, or Firm—Walter J. Tencza, Jr.

(57) ABSTRACT

An image projection lighting device is disclosed comprising a base housing, a yoke, and a lamp housing. The base housing may include or have located therein, a processing system and a communications port. The lamp housing may include or have located therein, a video projector, an anti-reflective aperture, a cooling system, and an air filter system. The image projection lighting device may further include a multicolor video display device, which may display a signal indicating a service alert, such as a filter service alert. Service information, concerning the image projection lighting device, may be transmitted by the image projection lighting device from the communications port to a central controller.

15 Claims, 6 Drawing Sheets

THEATRICAL FOG PARTICLE PROTECTION SYSTEM FOR IMAGE PROJECTION LIGHTING DEVICES

CROSS REFERENCE TO RELATED APPLICATIONS

The present application is a continuation of and claims the priority of U.S. patent application Ser. No. 10/657,630 filed on Sep. 8, 2003, now U.S. Pat. No. 6,988,807 which is a continuation in part of and claims the priority of U.S. patent application Ser. No. 10/360,185, now U.S. Pat. No. 6,969,960 titled "Image Projection Lighting Device" filed on Feb. 7, 2003. The present application claims the priority of application Ser. No. 10/657,630 and application Ser. No. 10/360,185 but not any other applications.

FIELD OF THE INVENTION

The present invention relates to image projection lighting devices.

BACKGROUND OF THE INVENTION

Lighting systems in the prior art are typically formed by interconnecting, via a communications system, a plurality of lighting fixtures and providing for operator control of the plurality of lighting fixtures from a central controller. Such lighting systems may contain multiparameter light fixtures, which illustratively are light fixtures having two or more individually remotely adjustable parameters such as focus, color, image, position, or other light characteristics. Multi-parameter lighting fixtures are widely used in the lighting industry because they facilitate significant reductions in overall lighting system size and permit dynamic changes to the final lighting effect. Applications and events in which multiparameter lighting fixtures are used to great advantage include showrooms, television lighting, stage lighting, architectural lighting, live concerts, and theme parks. Illustrative multi-parameter light devices are described in the product brochure entitled "The High End Systems Product Line 2001" and are available from High End Systems, Inc. of Austin, Tex.

A variety of different types of multiparameter light fixtures are available. One type of advanced multiparameter lighting fixture is an image projection lighting device ("IPLD"). Image projection lighting devices of the prior art typically use a light valve or light valves to project images onto a stage or other projection surface. A light valve, which is also known as an image gate, is a device for example such as a digital micro-mirror ("DMD") or a liquid crystal display ("LCD") that forms the image that is projected. Either a transmissive or a reflective type light valve may be used. U.S. Pat. No. 6,057,958, issued May 2, 2000 to Hunt, incorporated herein by reference, discloses a pixel based gobo record control format for storing gobo images in the memory of a light fixture. The gobo images can be recalled and modified from commands sent by a control console. A pixel based gobo image is a gobo (or a projection pattern) created by a light valve like a video projection of sorts. U.S. Pat. No. 5,829,868, issued Nov. 3, 1998 to Hutton, incorporated by reference herein, discloses storing video frames as cues locally in a lamp, and supplying them as directed to the image gate to produce animated and real-time imaging. A single frame can also be manipulated through processing to produce multiple variations. Alternatively, a video communication link can be employed to supply continuous video from a remote source.

IPLDs of the prior art use light from a projection lamp that is sent through a light valve and focused by an output lens to project images on a stage or a projection surface. The control of the various parameters of the IPLDs is affected by an operator using a central controller. In a given application, a plurality of IPLDs are used to illuminate the projection surface, with each IPLD having many parameters that may be adjusted by a central controller to create a scene.

IPLDs used in an entertainment lighting system can produce many colorful images upon the stage or projection surface. IPLDs may project images onto the projection surface such as still images, video images and graphic images. The term "content" is a general term that refers to various types of creative works, including image-type works and audio works. Content is typically comprised of still images, video images or loops and computer graphical images.

The Catalyst (trademarked) image projection lighting device manufactured by High End Systems of Austin Texas incorporates a video projector with a moveable mirror system that directs the images projected by the projector onto the stage or projection surface. A personal computer is used as a server that provides the images to the projector. A lighting controller sends command signals over a communication system to control the selection of images from the server to the projector as well as control the various functions of the video projector and the position of the image on the projection surface.

During a theatrical presentation the Image projection lighting devices are often operated in conjunction with theatrical fog generating devices. The theatrical fog or smoke generating devices are used to create an airborne haze that can be used as a projection surface creating three dimensional imagery. The fog generating devices create the airborne haze by propelling minute particles into the air which can remain suspended in the air for a considerable time. The minute particles are commonly created by the fog generating devices by atomization of oils or glycols. The glycol or mineral oil particles (referred to herein as fog particles) can each range in size from between twenty microns to below 0.1 micron.

When lighting devices such as image projection lighting devices contain complex optical and electronic components the fog particles may be drawn though the cooling system and may condense on the various optical components diffusing the projected image or shortening the life of the components. If a video projector is used for a component of the image projection lighting device, the video projector may often contain a filter system of its own. The filter system of the video projector offers very little protection for fog particles since most video projector filters rarely are effective on particles below ten microns such as those found in fog particles. Sanyo Electronics (trademarked) of Osaka, Japan has offered a filter cabinet called the Aircleanpro (trademarked) that uses an electrostatic air filtering system for improved operation of video projectors in cigarette smoke. Unfortunately a large percentage of fog particles are comprised of particles below ten microns since the airborne particles are in a continuous state of evaporation and electrostatic filters are not effective on these particles. There is a need to provide an image projection lighting device with a cooling filtration system that provides a high efficiency of filtration of fog particles below ten microns and that can provide a greater protection to the components of the image projection lighting device.

SUMMARY OF THE INVENTION

The present invention in one embodiment provides an improved image projection lighting device. The image projection lighting device of an embodiment of the present invention can be comprised of a base housing, a yoke, and a lamp housing. The base housing may include or have located therein, a processing system and a communications port. The lamp housing may include or have located therein, a video projector, an antireflective aperture, a cooling system, and an air filter.

Service information, concerning the image projection lighting device, may be transmitted by the image projection lighting device from the communications port to the central controller.

DETAILED DESCRIPTION OF THE DRAWINGS

Figure 1:
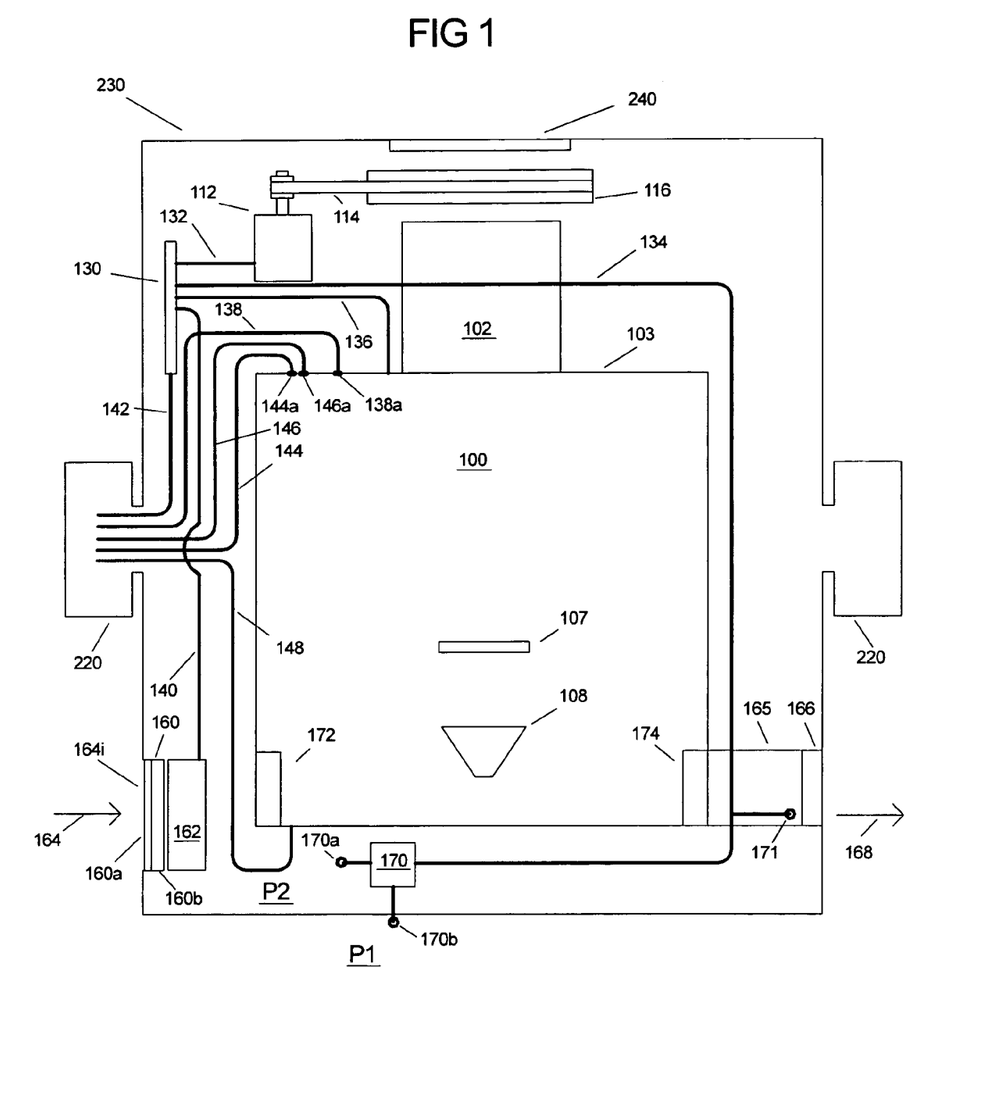
FIG. 1 shows a lamp housing and components therein for an image projection lighting device ("IPLD") in accordance with an embodiment of the present invention that incorporates a video projector.

FIG. 1 shows a lamp housing 230 for an image projection lighting device 10 (shown in FIG. 2) of an embodiment of the present invention. FIG. 1 also shows the yoke 220 that rotationally supports the lamp housing 230 and provides a means for tilting the lamp housing 230 in relation to the yoke 220. The motors and bearings that provide the pivotal connection of the yoke 220 to the external housing 230 are not shown for simplification. A video projector 100 with a video projector housing 103 is shown mounted within the lamp housing 230. The video projector 100 incorporates a zoom and focus lens 102. The video projector 100 contains a projection lamp 108 to create white light that is separated into separate colors that are directed towards a light valve 107 or light valves (not shown) used to project multicolored images from the projection lens 102. An aperture or window aperture 240 in the lamp housing 230 for emitting the projected light from the projector 100 is preferably made of antireflective glass. The window aperture 240 provides a relatively air tight seal for the area where the projected light exits from the projection lens 102 in the lamp housing 230. Cooling air enters thought the air filter system 160 as pulled in by the fan 162 in the direction of arrow 164 through an inlet 164i of the lamp housing 230 and pressurizes the lamp housing 230. The pressurized air in the lamp housing 240 enters an air inlet vent 172 of the projector 100 and exits the projector air exiting vent 174 though a duct 165 that directs the exiting air to the exiting vent 166 in the direction of arrow 168. An iris shutter 116 is driven by a belt 114 and a motor actuator 112. The motor actuator 112 is connected via wiring 132 to a lamp housing interface circuit board 130. The interface circuit board 130 provides motor driving signals to the motor actuator 112 (which may be an iris shutter motor actuator) that with the action of the belt 114 operates iris shutter 116 to open and close.

The interface circuit board 130 is shown connected to wiring 134 that connects to sensors 170 and 171. The sensor 170 provides signals representative of the pressure difference between the air pressure P2 within the housing 230 and the air pressure P1 outside the housing 230. Inlet ports 170a and 170b allow air pressure to enter the sensor 170. Inlet port 170a is located internal to the housing 230 and may read internal pressure. Inlet port 170b is located external to the housing 230 and may read external pressure. The sensor 170 may also be, or may be replaced by, an airflow sensor, but an air pressure sensor is preferred. Temperature sensor 171 provides signals representative of the exiting air temperature. The sensors 170 and 171 send signals over the wiring 134 to the interface circuit board 130. The interface circuit board 130 is electrically connected to the wiring 142. Wiring 142 travels through the yoke 220 to the base housing 210, shown in FIG. 3, and connects to the lamp housing circuit board and motor drive interface 318.

Figure 3:
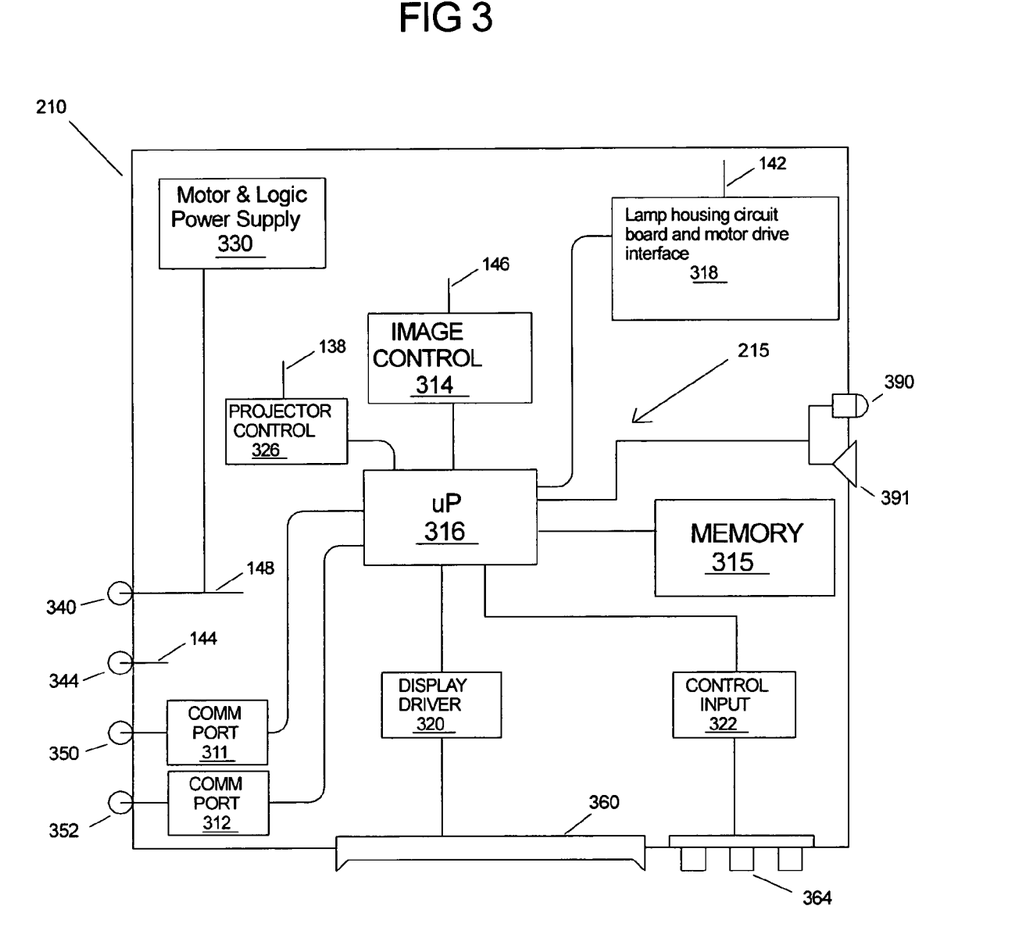
FIG. 3 shows a block diagram of components within the base housing of FIG. 2.

Wiring 138 shown in FIG. 1 is connected to a serial command port 138a of the video projector 100 that allows the functions of the video projector 100 to be remotely controlled by the projector control interface 326 of FIG. 3 and a status of the video projector 100 can also be transmitted from the video projector serial command port 138a through the wiring 138 to the projector control interface 326. The serial command port 138a of the projector 100 is used to control the various functions of the projector 100 such as on and off switching of the projector 100 and or lamp 108 and selecting a video input to the projector 100. Video inputs may be supplied to video input ports 144a and 146a of the projector 100, for example, from devices connected to wiring 144 or 146. The serial command port 138a may also control functions such as to control the color balance of the projector 100, speeds of an internal fan (not shown), the lamp 108 mode, such as normal or economy or any variable lamp output power level by commands received at the serial command port 138a. In addition, Projector status of service information may be sent from the serial command port 138a of the video projector 100 via wiring 138, through yoke 220 to the projector control interface 326, shown in FIG. 3, such as fan speed, lamp hours, the present lamp mode, the internal temperatures and a software version for computer software running the projector 100. Lamp hour service information describes operating hours on the lamp or the percentage of hours of lamp life left on the lamp 108. Commands to control the functions of the video projector 100 of FIG. 1 can be sent from the central controller 450 shown in FIG. 4 and received by the communications ports 311 or 312 shown in FIG. 3 to control the functions of the video projector 100. These projector control commands received by the communications ports 311 or 312 are sent to the processor 316, shown in FIG. 3, where in accordance with the operational code stored in the memory 315, these commands are processed and sent to the projector control interface 326 that in turn sends the commands to the projector serial command port 138a, shown in FIG. 1, over the wiring 138 to control the functions of the projector 100. Also service information can be sent from the projector 100 serial command port 138a, shown in FIG. 1, over the wiring 138 to the projector control interface 326. This service information can then in turn be sent to the processor 316 where it is processed in accordance with the operational software stored in the memory 315. This service information can also be sent to the communications ports 311 or 312 to be transmitted over the communications system to the central controller 450 shown in FIG. 4 and to be viewed by an operator on a display 452. The projector service information received by the central controller 450 on the display 452 can be read by an operator and used to help make decisions as to when projector service should occur. As shown in FIG. 1, a cooling fan 162 is connected by the wiring 140 to the interface circuit board 130. The interface circuit board 130 routes driving signals to the fan 162 that can control the fan 162 to be on or off as well as variably control a speed of the fan 162. The fan 162 is located behind an air filter system 160 and is used to pull outside air into the lamp housing 230 through inlet 164*i* in the direction of arrow 164 through the air filter system 160. The air filter system 160, the fan 162, the exit vent 166, and the sensors 170 and 171 are part of a cooling system. A prefilter 160*a* is the air inlet side of the filter system 160 and is exposed to the air on the outside of the lamp housing 230 and is used to filter the larger particles above ten microns before the air enters the secondary filter component 160*b* of filter system 160. The secondary filter component 160*b* is located so that filtered air passing through the prefilter 160*a* passes though the secondary filter component 160*b* before entering a projector air inlet vent or port 172. The filter system 160 filters cooling air coming into the lamp housing 230 so that the video projector 100 is protected from fog particles and debris. It is preferred that the prefilter component 160*a* of the filter system 160 be washable for easy service by a show technician. It is also preferred that the prefilter 160*a* be of a dark color such as gray or black since this prefilter 160*a* may be visualized by an observer looking at the housing of the IPLD 10 and larger particles such as pyrotechnics debris will be less visible.

The air drawn through the filter system 160 and then through the fan 162 is used to bring cooling air to the projector 100. Cooling air is input to the lamp housing 230 to provide cooling airflow to the inside of the lamp housing 230. The cooling air exits through a vent 166 in the direction of arrow 168.

Wiring 146 connects to a video input port 146*a* of the video projector 100 and is routed through the yoke 220 and is connected in the electronic housing 210, shown in FIG. 3 to the image control 314. A video input supplied to the video input port 146*a*, by the image control 314 via wiring 146 through yoke 220, may be digital or analog such as an RGB (red, green, or blue) signal, component or composite video. Wiring 144 connects to an additional video input port 144*a* of the projector 100, and is routed through the yoke 220, and is connected in the base housing 210, shown in FIG. 3, to the external connector 344. The wiring 146 can be a video coax cable for communicating video signals requiring great flexibility since the lamp housing 230 can be repetitively positioned to the base housing 210 during a show. It has been found that a coaxial cable constructed of cadmium bronze conductors increases the life span of the coax cable under flexing conditions. One such coax cable manufactured with cadmium bronze conductors is part number 7500a and is manufactured by Belden Wire and Cable Company of St. Louis Mo. Wiring 148 provides power to the video projector 100 from an outside power source like a power line from the external connector 340 shown in FIG. 3, and through the yoke 220 shown in FIG. 1. Connector 340 is connected by any suitable means to an AC power source. The motor and logic power supply 330 also supplies power for the motors such as pan and tilt (not shown), the iris shutter motor 112 of FIG. 1, and a control system 215, shown in FIG. 3, in the base housing 210.

Figure 2:
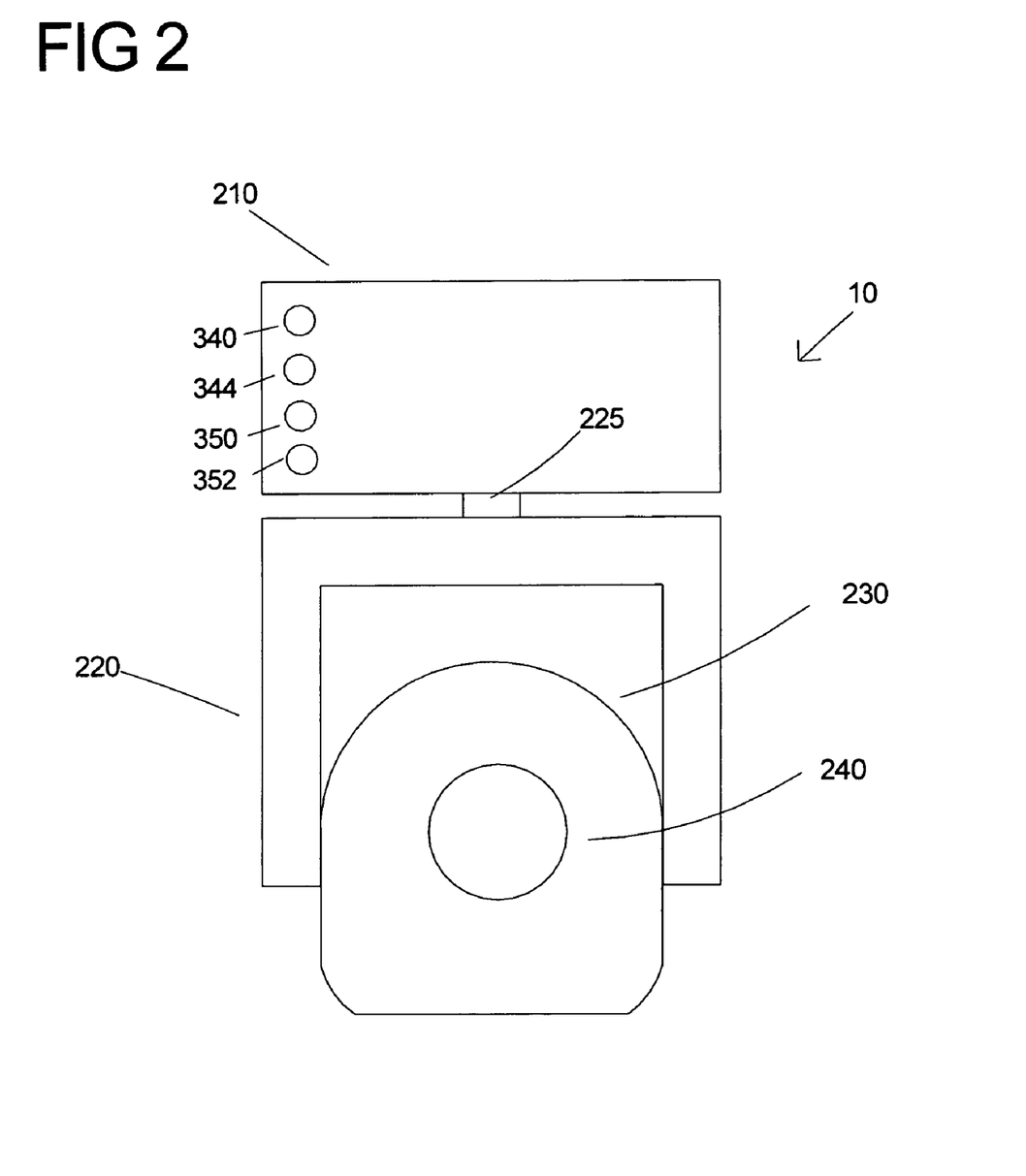
FIG. 2 shows an external view of the image projection lighting device of which the lamp housing and components of FIG. 1, and a base housing are a part.

FIG. 2 shows an external view of the image projection lighting device 10. The base housing 210 of FIG. 2 is also shown in FIG. 3. The power connector 340 is shown for connecting to a source of power. The external video input connector 344 allows the video input port 144a of the projector 100 to be connected to an outside source. External connector 350 connects outside communication from a communication system such as central control system 450 shown in FIG. 4 to communications port 311. Central control system 450 can operate a plurality of image projection lighting devices, such as image projection lighting devices 10 and 20 of FIG. 4. Image projection lighting device 10 may communicate with the central control system 450 via the communications port 311, shown in FIG. 3. External connector 352 may connect communication from an additional communication system, similar to central controller 450 shown in FIG. 4 for operating a plurality of image projection lighting devices to a second communications port 312. A description of multiple communication systems for multiparameter lights and the advantages thereof is provided in U.S. Pat. No. 6,331,756 entitled "Method and Apparatus for Digital Communications with Multiparameter Light Fixtures," which issued Dec. 18, 2001 and in U.S. Pat. No. 6,459,217, entitled "Method and Apparatus for Digital Communications with Multiparameter Light Fixtures", which issued on Oct. 1, 2001 and these patents are incorporated herein by reference in their entirety.

A bearing 225 shown in FIG. 2 allows for panning of the yoke 220 in relation to the base housing 210. A pan motor (not shown for simplification) drives the panning of the yoke 220 for rotation in relation to the base housing 210 and the pan motor is powered by control signals from the lamp housing circuit board and motor drive interface 318, shown in FIG. 3. The yoke 220 is connected by bearings (not shown for simplification) to the lamp housing 230. The lamp housing 230 is driven to rotate in relation to the yoke 220 by a tilt motor (not shown for simplification). The tilt motor is powered by control signals from the lamp housing circuit board and motor drive interface 318 shown in FIG. 3. An antireflective glass aperture 240 is shown in FIG. 2, for exiting the projected light from the lens 102 of projector 100 from the lamp housing 230, shown in FIG. 1.

FIG. 3 is a block diagram of components within the base housing 210 of the IPLD 10. A control system 215, shown in FIG. 3, for remote control of the IPLD 10 may be constructed of at least a processor 316 that may be termed a processing system and which may include multiple processors or discrete components that are used to process data. The control system 215 of FIG. 3 also may include a separate memory 315 or the control system 215 may include memory which is part of the processor 316. The external circuit board and motor drive interface 318 for sending control signals to motors and an image control interface 314 may be included as part of the control system 215, shown in FIG. 3. External connectors 340, 344, 350 and 352 are shown mounted to the base housing 210 for connecting a source of power, an external video input, and first and second communications systems, respectively. Connector 352 connects to communications port 312. The connector 352 may be connected to an external communications system such as the communications system including components 442, 436 and 438 shown in FIG. 4, wherein the communications system may provide address and command signals as well as content. The communications port 312 sends the received address, command signals and content to the processor 316 where they may be acted upon to control the parameters of the IPLD 10 and provide the content to the image control 314 to be projected by the projector 100 or to be stored into the memory 315. The communications port 312 may also be used to transmit content stored in the memory 315 to the communications system, such as the communications system including components 442, 436 and 438 shown in FIG. 4, to other IPLDs, such as IPLD 20 shown in FIG. 4, or to a central controller, such as central controller 450, as well as transmit service information to the central controller 450 or a service device. A suitable system, method and apparatus for communicating image content, from a central controller to one or more IPLDs and between IPLDs under control of a central controller is described in U.S. Pat. No. 6,605,907 entitled "Method, Apparatus and System for Image Projection Lighting," filed Mar. 4, 2002, incorporated herein by reference The connector 350 connects to communications port 311. The connector 350 may be connected to an external communications system providing address, commands and content such as the communications system including components 442, 436 and 438 of FIG. 4. The address and commands signals received by the communications port 311 are sent to the processor 316 where they may be acted upon to control the parameters of the IPLD 10 of an embodiment of the present invention. The communications port 311 may also transmit data to the communications system, such as the system of FIG. 4, including components 442, 436 and 438, such as service information. Service information data transmitted over the communication system may be the projector lamp life, the status of the air filter system 160, the internal temperatures of the projector 100 or the lamp housing 230, the serial number of the projector 100, the version number of the operating code stored in the memory 315 or the version of the operating code stored in the projector 100. The communications ports 311 and 312 may be individual devices acting as communications ports or they may be part of the processor 316. The communications ports 311 and 312, each may be any device connected to an external communications system for receiving and transmitting digital commands and transferring digital data.

The processor 316 is connected to the memory 315. The memory 315 may be any type of memory capable of storing information. The memory 315 may contain the operating system of the IPLD 10 as well as content to be projected by the projector 100. The processor 316 is connected to the projector control interface 326. The projector control interface 316 is connected to the serial command port 138a of the video projector 100. When the appropriate commands are received by the communications ports 311 or 312 the processor 316 may act in accordance with the operating software stored in the memory 315 by sending command signals to the projector control interface 326 to operate various functions of the projector 100. The processor 316 may also receive from the projector control interface 326 service information that in turn the processor 316 forwards to the communications port 311 or 312 for transmission over a communications system, such as the communications system including components 438, 436 and 442, to a central controller, such as central controller 450, or other receiving device requiring the desired information.

The image control system 314 is connected to the processor 316. The image control system 314 provides video output to the projector 100, via the wiring 146. The image control system 314 may be a computer video card used for the manipulation of the content before it is projected by the projector 100. The image control system 314 is capable of manipulation of pixel maps created by the content that is received by the image control system 314. The processor 316 may receive various commands over a communications system through communications ports 311 or 312 to alter the content. The content may be altered by the image control system 314 in various ways such as rotation of the image, keystone correction, image intensity, and as well as independent control of the pixels for the separate colored images that form a colored image.

As shown in FIG. 3, the processor 316 is also connected to a display driver 320 for providing image control of a multicolor video display device 360. The multicolor video display device 360 is preferably an LCD multicolored display capable of displaying multicolored images of the content stored in the memory 315 or the content sent over a communications system, such as the communications system including components 438, 436 and 442 of FIG. 4, through one or both of communications ports 311 or 312. It is desirable that the multicolor video display device 360 be capable of displaying content for the purpose of programming IPLD parameters as well as what content will be projected by the projector 100. As shown by FIG. 3, an input keypad 364 is connected to a control input interface 322. The input keypad 364 is used by an operator or lighting director to control the parameters of the IPLD 10 of an embodiment of the present invention and select what content is to be projected by the projector 100 as well as selecting what content is previewed on the multicolored video display device 360. The control input interface 322 sends the commands inputted through the input keypad 364 to the processor 316 where they can be acted upon based on the operational software stored in the memory 315. The input keypad 364 and the multicolor video display device 360 can be components of a stand alone control system or controller.

The lamp housing circuit board and motor drive interface 318 is shown connected to the processor 316 in FIG. 3. The interface 318 provides control signals to the motors used for pan and tilting of the lamp housing 230 in relation to the base housing 210 and the yoke 225, shown in FIG. 2 (connections and motors not shown for simplification). The interface 318 provides control signals to the motor actuator 112, shown in FIG. 1 through interface circuit board 130. The lamp housing circuit board and motor drive interface 318 also sends to the processor 316 information provided by the sensors 170 and 171 via interface circuit board 130 and wiring 134 shown in FIG. 1. The lamp housing circuit board and motor drive interface 318 controls the fan 162 to be on or off and with variable speed through the interface circuit board 130, and through wiring 140.

Figure 4:
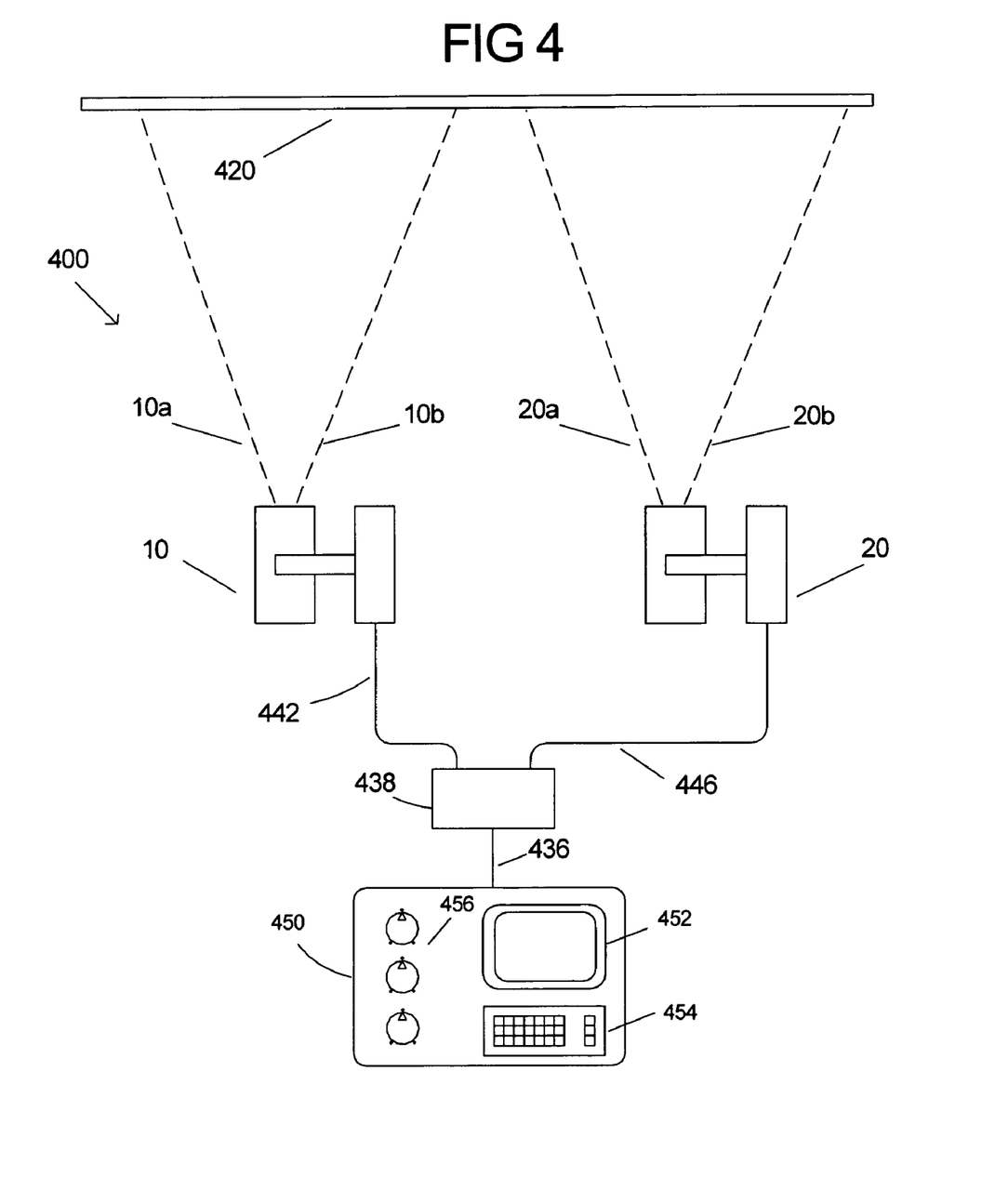
FIG. 4 shows a lighting system using two IPLDs of an embodiment of the present invention and a central controller.

FIG. 4 shows a lighting system 400 and IPLDs 10 and 20. The IPLD 20 may be the same as the IPLD 10 in accordance with an embodiment of the present invention. The central controller 450 is shown and is comprised of a video display device 452, an input keypad 454 and input devices 456. A communications cable 436 is shown connected between the central controller 450 and a communications interface 438. The communications interface 438 is shown connected by communication cable 442 to IPLD 10 and by communication cable 446 to IPLD 20. IPLD 10 is shown projecting on a projection surface 420 and the projection field is indicated by dashed lines 10a and 10b. IPLD 20 is shown projecting on a projection surface 420 and the projection field is indicated by dashed lines 20a and 20b. Although only two IPLDs are shown for the lighting system 400 of FIG. 4 many more IPLDs can be interconnected to form the lighting system, such as lighting system 400.

The filter system 160 of the lamp housing 230 shown in FIG. 1 can become saturated with debris and fog particles over a period of time with usage of the IPLD 10. The prefilter 160a may be preferably constructed of an open cell foam. The prefilter 160a can be used to capture dust from pyrotechnics that are often used in rock stage shows. The prefilter 160a can be integrated with the secondary filter 160b and the filter system 160 may not have a detachable prefilter 160a in which case the entire filter system 160 can be disposable. The prefilter 160a is preferably detachable from the secondary filter system 160b. The prefilter 160a also helps to protect larger debris from loading the secondary filter 160b. The secondary filter 160b is preferably constructed of a glass mat type filter media fabricated of glass fibers. The secondary filter 160b is preferably at least 99.97% efficient at 0.3 microns as standardized by standards 52.1, 52.2 and 62 of ASHRAE (American Society of Heating, Refrigerating, and Air-Conditioning Engineers) located in Atlanta Ga. This filter is also known as a hepa filter (high efficiency particulate air filter). The secondary filter 160b filters out most of the fog particles above 1 micron so that primarily only a very low percentage of submicron particles are able to pass through the secondary filter 160b and into the lamp housing 230.

The fan 162 pulls the outside air through the filter system 160 and pressurizes the lamp housing 230 that contains the projector 100. The pressurized air is received by the projector inlet vent 172 where it provides cooling air to the projector 100. The projector cooling air exits the projector exit air vent 174 and travels through duct 165 where it is directed towards the exit vent 166 to the outside air. The lamp housing 230 that contains the projector 100 may be an injection molded housing with several service access doors (not shown). The access doors may not be air tight. It is important to make sure that the air pressure shown as P2 in FIG. 1 within the housing 230 is greater than the outside air pressure shown as P1. If the lamp housing 230 does not contain pressurized air then it is possible that the projector 100 that may also contain a cooling system may draw air through the projector inlet vent 172 that is not filtered by the filter system 162. Instead, if the lamp housing 230 is not pressurized with filtered air as provided by the filter system 160, the projector 100 may pull unfiltered air from the outside though leaks created by the access door crevices or other minute openings found in the lamp housing 230.

The air pressure P2 in the lamp housing 230 is sensed by air pressure sensor 170. The air pressure sensor 170 may contain a first port 170a for sensing pressure P2 internal to the lamp housing 230 as created by the fan 162 and the filter system 160. The air pressure sensor 170 may also contain a second port 170b for sensing the pressure P1 outside of the lamp housing 230. One type of usable pressure sensor is the piezoelectric pressure sensor manufactured by Honeywell Sensing and Control of Freeport Ill. The sensor 170 converts the sensed pressures at P1 and P2 to electronic signals that are sent along wiring 134 to the interface circuit board 130. The interface circuit board 130 is electrically connected to the wiring 142. Wiring 142 travels through the yoke 220 to the base housing 210, shown in FIG. 3, and connects to the lamp housing circuit board and motor drive interface 318. The lamp housing circuit board and motor drive interface 318 is shown connected to the processor 316 in FIG. 3. The processor 316 can receive the electronic pressure signals generated by sensor 170 and in conjunction with the operational code stored in the memory 315 determine the condition of the filter system 160 and cooling system pressure P2.

In operation, the pressure P2 of the lamp housing 230 should be higher than the outside pressure P1. The filter system 160 as it is exposed to fog particles starts to saturate with the fog particles or "load". The filter system 160 can be said to have various conditions throughout the life of the filter system 160 such as unloaded (new filter), partially loaded or fully loaded (clogged filter) or anything in between. As the filter "loads" the pressure P2 inside of the lamp housing 230 is reduced. The reduction of pressure P2 inside of the lamp housing 230 when compared to the outside pressure P1 as sensed by the sensor 170 directly indicates the loading of the filter system 160. As the pressure P2 in the lamp housing 230 is determined by the processor 316 and the operational code stored in the memory 315 to be reduced below an optimum pressure value, the fan 162 can have its speed increased by the processor 316 to compensate for the loading filter system 160. By increasing the speed of the fan 162 the pressure in the lamp housing 230 can be increased to the optimum pressure value as determined by the operational code stored in the memory 315 and electronic signals from the sensor 170.

At some point the fan 162 may have its speed fully increased and therefore may not be able to further compensate for the loaded filter system 160. When the processor 316 in conjunction with the operational code stored in the memory 315 has determined that the fan is at the highest possible speed and the filter system has loaded to a point where the optimum pressure P2 of the lamp housing 230 is no longer attainable a service filter alert (also referred to as Service Filter) can be sent by the processor 316. The filter service alert signal can be sent over the communication system to the central controller 450 of FIG. 4. Since a filter is not likely to be changed during a performance event in progress the electronic pressure values as determined by the sensor 170 may be stored in the memory 315 of FIG. 3. This way the status of the filter system 160 can be determined by the processor 316 from the memory 315 and communicated over the communications system, including 442, 436 and 438, upon the next initialization (power up) of the product or by a request command from the central controller 450. The filter alert may also be sent to the multicolor video display device 360 of FIG. 3 or the IPLD 10 may be instructed by the processor 316 to provide a visual filter alert by varying a parameter of the IPLD 10 that can be observed by an observer. For example the IPLD 10 may project images from the projector 100 of FIG. 1 during the initialization of the IPLD 10 to project a red color with the text "filter alert" or "service filter" or any text, graphics or colors to be observed by an operator or technical person on the projection surface 420 show in FIG. 4 that warns the operator or technical person that the filter 160 is in need of service. The initialization process, starting up or homing up of the IPLD 10 occurs just after the IPLD 10 shown in FIG. 4 is connected to power. The IPLD 10 of FIG. 4 may also simply refuse to operate normally after initialization by for example not projecting light or images on the projection surface 420 of FIG. 4 from projector 100 to bring attention to the operator that there is a need for service. By refusing to operate normally, the IPLD 10 will bring the needed attention to the operator before the performance event starts. The IPLD 10 may also display other types of service alerts one of which could be a filter service alert on the multicolor video display device 360.

Various filter service alert notifications or conditions of filter 160 to a technician (also referred to as an operator in this text) may be communicated by the processor 316 such enabling an audible sound caused by a sound transducer of the IPLD 391 of FIG. 3, enabling a pilot lamp of the IPLD 390, projection of an image by the projector 100, displaying the alert on the display 360, communicating to the console 450 so that it can be displayed on the monitor 452 or the IPLD refusing to operate or operating unexpectedly. A filter service alert is any notification to a technician or an operator that a filter such as filter system 160, or one of the components 160a or 160b, may need to be serviced or replaced without requiring a visual inspection of the filter system 160 by a technician. Upon startup of the IPLD 10 the processor 316 may receive electronic pressure signals from the sensor 170. If the pressure P2 of the lamp housing 230 is not at optimum pressure the processor 316 may lock out the projector 100 operations so that the lamp 108 in the projector 100 may not be struck or operated. This will bring to the attention of the operator the need for service of the filter system 160. If the pressure P2 in the lamp housing 230 is below an optimum value the IPLD will not operate correctly or project images.

If the processor 316 determines that the lamp housing pressure P2 is critically low it is possible to increase the pressure P2 by operating the lamp 108 of the projector 100 at a reduced or economy mode. This can be accomplished with the processor 316 sending control signals to the projector control interface 326, shown in FIG. 3, that command the projector 100 to change the lamp mode to a reduced lamp power level. When the projector 100 is operating its lamp 108 at a reduced power level the fans (not shown) in the projector 100 can operate at a reduced speed thus requiring a reduced airflow entering into projector air inlet 172. By reducing power to the lamp 108 in the projector 100 and the projector 100 requiring less airflow the pressure P2 in the lamp housing 230 may be increased even with a loaded filter. This may allow a technician or operator of a show enough time to complete a show without having the IPLD 10 shut down or stop projecting.

With the IPLD of an embodiment of the present invention the fan 162 speed is regulated by the loading of the filter system 160. With an unloaded filter system 160, the fan 162 should have its speed reduced to a minimum to maintain the optimum pressure P2. With a loaded filter system 160 the fan 162 will have its speed increased to maintain the optimum pressure P2 of the lamp housing 230. For shows where the IPLD 10 is subject to minimum or no fog particles and as such reduced filter loading, the speed of the fan 162 will also be at minimum reducing the distraction of noise.

Figure 5:
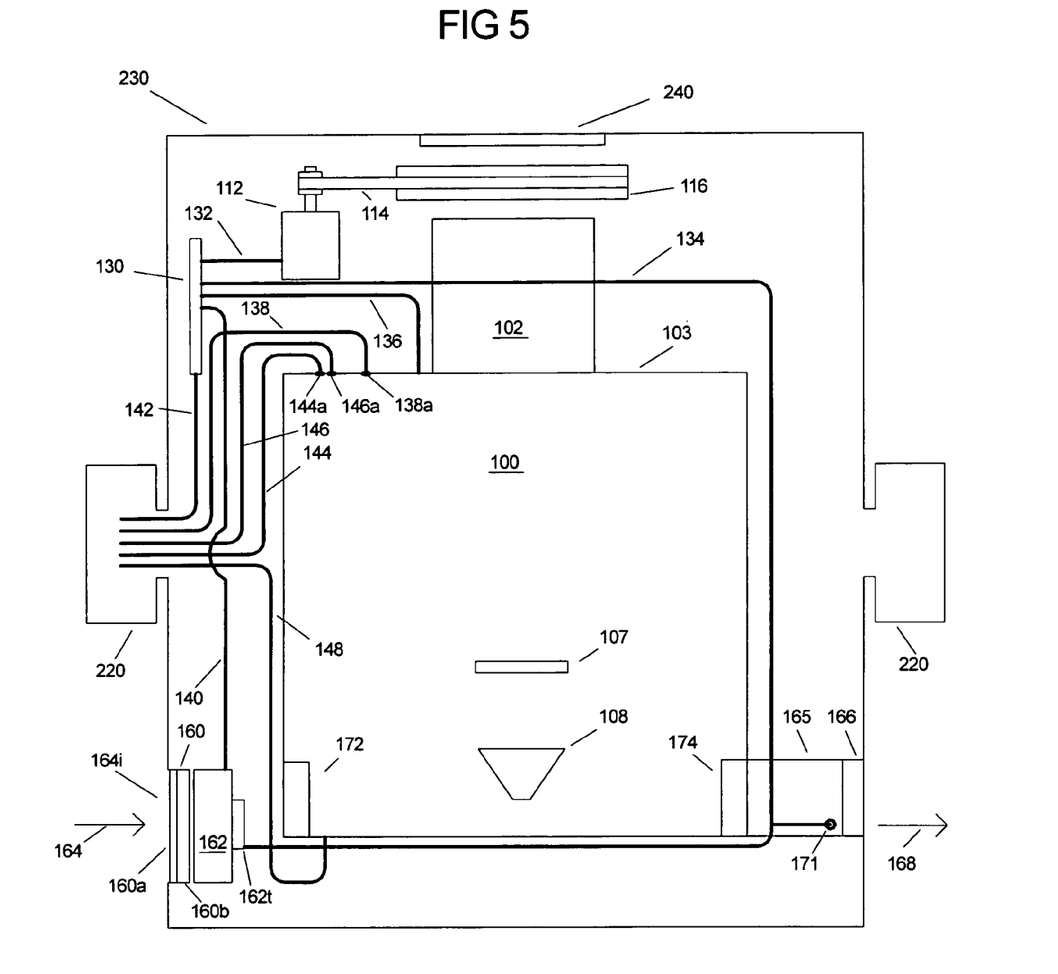
FIG. 5 shows all the same components as FIG. 1 except a pressure sensor in FIG. 1 has been replaced with a tachometer sensor.

Alternatively there are other sensing techniques that could be used to detect the status of the filter in the IPLD 10. FIG. 5 shows all the same components as FIG. 1 except the pressure sensor 170 has been replaced with a tachometer sensor 162t that is attached to the fan 162 to measure the rotational speed of the vanes. If the fan 162 input voltage and current are known then we can expect a certain rotational speed of the fan 162 based upon the vacuum created by the filter system 160. For example if the filter system 160 is removed from the IPLD 10 in FIG. 5 the fan 162 at a known voltage and current (power level) will spin at a slower rate or revolutions per minute (RPM). This is because the fan 162 spins slowly with more airflow. The tachometer sensor 162t can provide information via wiring 134 to the processor 316 as to the speed of rotation of the vanes of the fan 162. By using operational code stored into the memory 316 as to what RPM the fan 162 is expected to operate at a given fan power input power level the condition of the filter system 160 can be determined. For example at a known input power level a slow fan speed (RPM) can extrapolated to indicate "no filter". If the processor 316 in conjunction with the operational code stored in the memory 315 determine based upon revolutions per minute (RPM) of the fan 162 that no filter is in place the IPLD 10 may not be allowed to function normally until a service technician installs the correct filter.

The RPM of the fan 162 can also be used by the processor 316 to determine that a filter system 160 is in place as this will increase fan speed at a known fan input power level as determined by the processor 316 in conjunction with the operational code stored in the memory 315. If the speed of the fan (RPM) should increase to a rate beyond the expected rate of an unloaded (or new filter) then a "service filter" alert can be determined by the processor 316 working in conjunction with the operational code stored in the memory 315. If the speed of the fan 162 increases even further it can determined by the processor 316 working with the memory 315 that the IPLD 10 may need to be shut down or refuse to operate normally as the filter system 160 is fully loaded or the filter system 162 may be blocked. The processor 316 may compare the speed of the fan 162 to a known input power level to determine if filter system 160 is in place, if a filter system 160 needs service, the condition of the filter system 160 and if the filter system 160 is fully loaded. The tachometer 162t may be a component of the fan 162 or the tachometer 162t may be a separate component.

Figure 6:
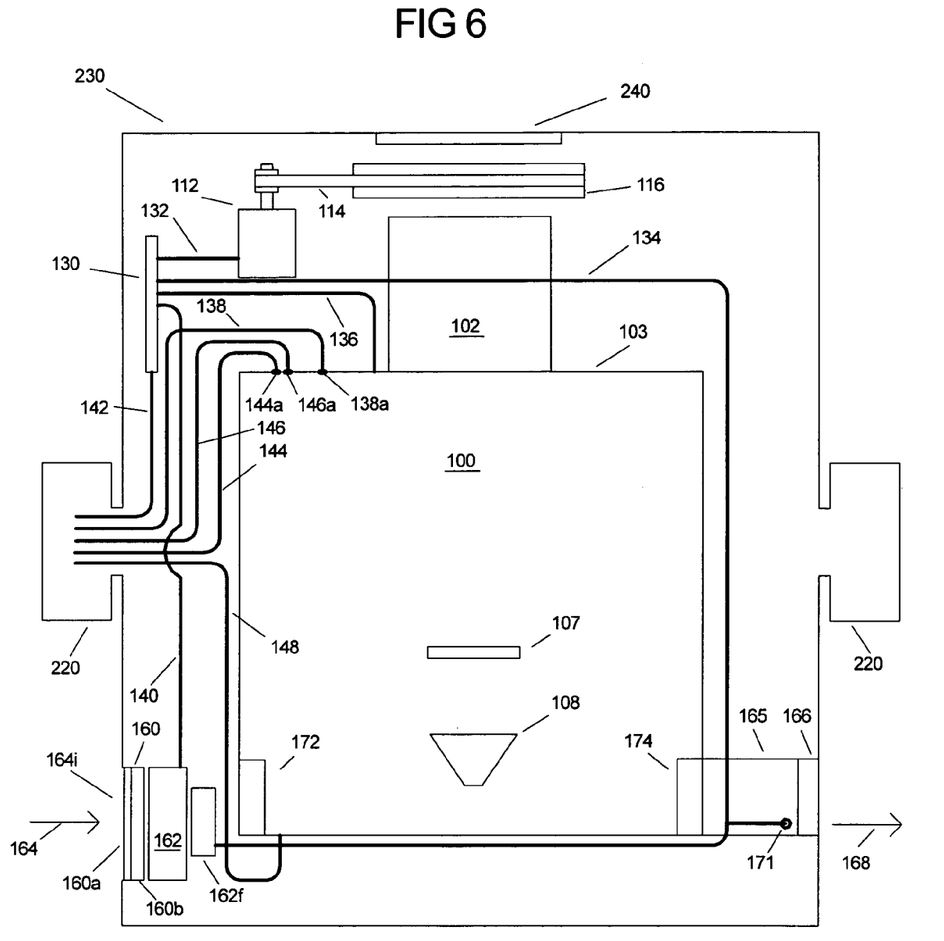
FIG. 6 as all the same components as FIG. 5 except a tachometer sensor in FIG. 5 has been replaced with an air flow sensor.

A different technique for determining the condition of the filter may use a different sensing technology. FIG. 6 shows all the same components as FIG. 5 except the tachometer sensor 162t of FIG. 5 has been replaced by an air flow sensor 162f. The air flow sensor 162f may be an air flow sensor such as the D6A sensor available from Omron (trademarked) Electronic Schaumburg Ill. The sensor 162f can send electronic signals representing the air flow from the fan 162 to the processor 316 over wiring 134. The processor 316 in conjunction with the operational code stored in the memory 315 can determine if the filter system 162 is in place, the condition of the filter system, or if the filter system 162 is fully loaded. If the airflow is determined to be higher than a reference point stored in the operational code of the memory 315, the processor 316 can determine that no filter system 162 is in place. If the airflow is determined by the processor 316 to be at a reference point then the filter system 160 can be determined to be in place and unloaded (new filter). If the airflow drops below the reference point the processor 316 in conjunction with the memory 315 can determine that a service filter alert needs to be provided. If the airflow continues to drop and reaches a value that is determined by the processor 316 in conjunction with the operational code stored in the memory 315 to be too low then the processor 316 may send a control signal to the projector control 326 to shut off the projector 100. The processor 316 working in conjunction with the operational code stored in the memory 315 can report the condition of the filter system 160 to an operator or technician. The reported condition of the filter system 160 of the IPLD 10 could be visualized on the display 360, projected on to the projection surface 420 by the projector 100, sent over the communications system to be read by an operator of the central controller 450 or the condition could be reported by pilot lights or audio tones such as lamp 390 or transducer 391, shown in FIG. 3.

In yet another variation of how to determine the condition of the filter system 160, the operating current of the fan 162 can be sensed as a value at a known operating voltage by the processor 316 working in conjunction with the operational code stored in the memory 315. An unloaded filter system 160 allows more air flow to be pulled by the fan 162 therefore the current required by the fan 162 is higher. If the filter system 160 is fully loaded the fan 162 will have difficulty moving air and the fan 162 will operate closer to a vacuum. Since the fan 162 is not moving as much air the current required is lower. By sensing the current requirements of the fan 162 at a known voltage the processor 316 working with the operational code stored in the memory 315 can determine the filter system 160 condition. The processor 316, working in conjunction with the operational software in the memory 315, can determine no filter, unloaded filter and loaded filter.

Various filter service alert notifications or other conditions of filter system 160 to a technician (also referred to as an operator in this text) may be communicated by the processor 316 such as an audible sound caused by a sound transducer of the IPLD 391 of FIG. 3, a pilot lamp of the IPLD 390, projection of an image by the projector 100, displaying an alert on the display 360, communicating to the console 450 so that it can be displayed on the monitor 452 or the IPLD 10 refusing to operate or operating unexpectedly. A filter service alert is any notification to a technician or an operator that a filter system, such as filter system 160, may need to be serviced or replaced without requiring a visual inspection of the filter system 160 by a technician.

The condition of the filter system 160 can be stored into the memory 315. This allows a filter service alert to be sent from the IPLD 10 of FIG. 4 to the console 450 so that an operator of the console may be alerted by the console display 452. The IPLD 10 by using the appropriate sensing technology can alert a technician by any suitable means that the filter system 160 is not in place and the condition of the filter system 160 therefore avoiding damage to the projector 100 or the shut down of the projector or lamp 108 during a show.

I claim:

1. A stage lighting apparatus comprising:
    an image projection lighting device for operation in theatrical fog comprising:
    a base housing;
    a yoke;
    a lamp housing;
    a motor which can change the position of the lamp housing in relation to the yoke; and
    a motor which can change the position of the yoke relation to the base housing;
    further comprising a processing system;
    a communications port;
    the lamp housing comprising:
        a cooling fan,
        a first air inlet,
        a first air filter,
        a lamp, and
        a light valve;
    the base housing comprising a video display device that can display multicolored images of content to an operator;
    wherein the cooling fan, the air first inlet and the first air filter together form at least part of a filtration system for filtration of theatrical fog particles;
        wherein cooling air external to the lamp housing enters the lamp housing through the first air inlet to pass through the first air filter to form a first filtered air; and
        wherein a first communication as to a status of the first air filter to a technician is accomplished by projecting an image from the lamp housing of the image projection lighting device.

2. A stage lighting apparatus comprising:
    an image projection lighting device for operation in theatrical fog comprising:
    a base housing;
    a yoke;
    a lamp housing;
    a motor which can change the position of the lamp housing in relation to the yoke; and
    a motor which can change the position of the yoke in relation to the base housing;
    further comprising a processing system;
    a communications port;
    the lamp housing comprising:
        a cooling fan,
        a first air inlet,
        a first air filter,
        a lamp, and
        a light valve;
    the base housing comprising a video display device that can display multicolored images of content to an operator;
    wherein the cooling fan, the air first inlet and the first air filter together form at least part of a filtration system for filtration of theatrical fog particles;
        wherein cooling air external to the lamp housing enters the lamp housing through the first air inlet to pass through the first air filter to form a first filtered air; and
    further comprising
    a pilot lamp; and
    wherein a first communication as to a status of the first air filter to a technician is accomplished by the technician viewing the pilot lamp.

3. A stage lighting apparatus comprising:
    an image projection lighting device for operation in theatrical fog comprising:
    a base housing;
    a yoke;
    a lamp housing;
    a motor which can change the position of the lamp housing in relation to the yoke; and
    a motor which can change the position of the yoke in relation to the base housing;
    further comprising a processing system;
    a communications port;
    the lamp housing comprising:
        a cooling fan,
        a first air inlet,
        a first air filter,
        a lamp, and
        a light valve;
    the base housing comprising a video display device that can display multicolored images of content to an operator;
    wherein the cooling fan, the air first inlet and the first air filter together form at least part of a filtration system for filtration of theatrical fog particles;
        wherein cooling air external to the lamp housing enters the lamp housing through the first air inlet to pass through the first air filter to form a first filtered air; and
    wherein a first communication as to a status of the first air filter is sent by the processor from the communications port over a communications system to a central controller.

4. The stage lighting apparatus of claim 1 further comprising
    a second air filter used as a prefilter to the first air filter.

5. The stage lighting apparatus of claim 4 wherein the second air filter is washable.

6. The stage lighting apparatus of claim 1 wherein the first air filter is a glass matt filter.

7. The stage lighting apparatus of claim 1 wherein the first air filter substantially filters theatrical fog particles above one micron.

8. The stage lighting apparatus of claim 2 further comprising
a second air filter used as a prefilter to the first air filter.

9. The stage lighting apparatus of claim 8 wherein the second air filter is washable.

10. The stage lighting apparatus of claim 2 wherein the first air filter is a glass matt filter.

11. The stage lighting apparatus of claim 2 wherein the first air filter substantially filters theatrical fog particles above one micron.

12. The stage lighting apparatus of claim 3 further comprising
a second air filter used as a prefilter to the first air filter.

13. The stage lighting apparatus of claim 12 wherein the second air filter is washable.

14. The stage lighting apparatus of claim 3 wherein the first air filter is a glass matt filter.

15. The stage lighting apparatus of claim 3 wherein the first air filter substantially filters theatrical fog particles above one micron.

* * * * *